July 11, 1939. H. E. BAER 2,165,198
AUTOMATIC CONTROL MEANS FOR DEICING MECHANISMS FOR AIRCRAFT
Original Filed Dec. 14, 1935
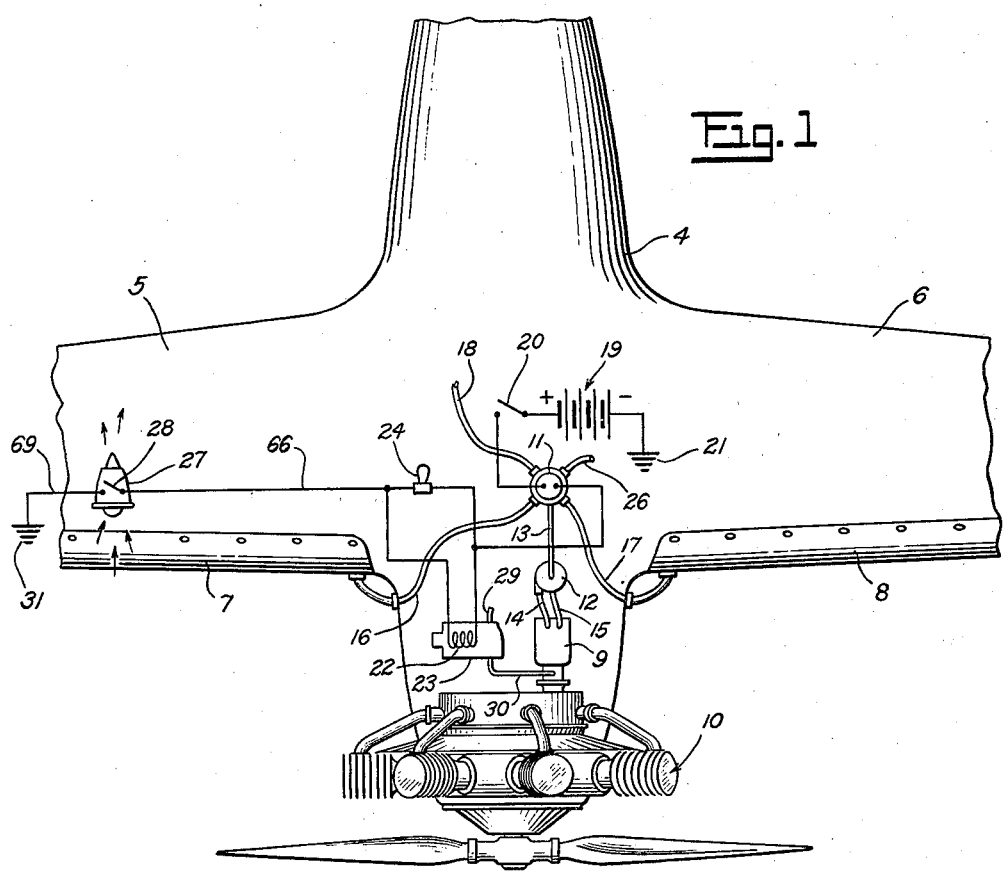
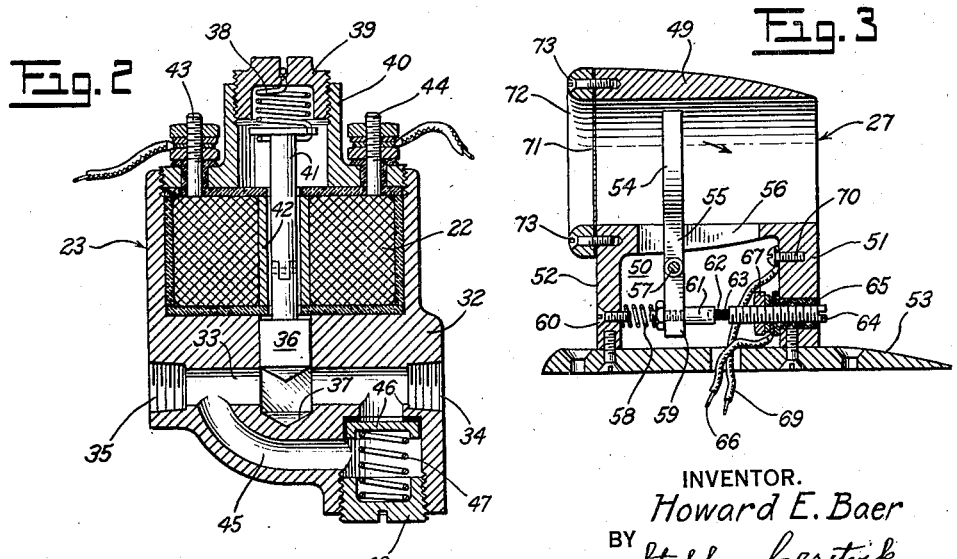
INVENTOR.
Howard E. Baer
BY Stephen Cerstvik.
ATTORNEY.

Patented July 11, 1939

2,165,198

UNITED STATES PATENT OFFICE 2,165,198

AUTOMATIC CONTROL MEANS FOR DEICING MECHANISMS FOR AIRCRAFT

Howard E. Baer, Garfield, N. J., assignor to Eclipse Aviation Corporation, East Orange, N. J., a corporation of New Jersey Application December 14, 1935, Serial No. 54,487
Renewed April 22, 1938

6 Claims. (Cl. 244—134)

The present invention relates to de-icing mechanisms for aircraft and more particularly to automatic control means for such mechanisms.

De-icing mechanisms such as shown, for example, in Patent No. 1,990,866 to David Gregg, dated February 12, 1935, and owned by the assignee of the present application comprise, generally, rubber fabric coverings which are affixed to the aircraft surface on which ice might form as, for example, on the leading edges of the wings and tail structure. These surface coverings are composed of several layers of rubber and fabric which form tubular air cells. The coverings are fitted to the surface of the aircraft so that the cells are parallel to the surfaces which are to be protected. The removal of ice formation is accomplished by periodically inflating and deflating the tubular cells, the constant movement of the surface coverings and the stretching of the rubber breaking the ice which is then carried away by the air stream.

An aircraft installation normally consists of an engine driven air pump, an oil separator and a distributing valve used in conjunction with the de-icers. The engine driven air pump provides the necessary air pressure to inflate the air cells of the de-icers. The oil separator removes the oil vapor from the air supplied by the pump and also regulates the air pressure to the de-icer air cells. From the oil separator the air pressure is transmitted to a distributing valve which, as it rotates, controls the periodic inflation and deflation of the de-icer air cells.

Heretofore, de-icing mechanisms of the above type had to be manually controlled, i. e., the mechanism had to be manually started and stopped thereby requiring the pilot's attention and judgment as to when the de-icing mechanism should be started in operation. Sometimes it is difficult to ascertain just when ice is forming on the aircraft surface and, hence, the pilot may not be aware of the fact that ice is forming on his ship until he begins to note a loss of altitude or difficulty in maneuvering his ship.

It is, therefore, one of the objects of the present invention to provide novel means for automatically starting de-icing mechanism of the class described when ice begins to form on the wings or other surfaces of the aircraft, whereby the pilot is relieved of the necessity of observing whether ice is forming before starting the de-icing mechanism.

Another object is to provide, in combination on an aircraft, de-icing mechanism for preventing ice formation on surfaces of the craft or if ice is formed for breaking up such ice formation, and means for automatically rendering such de-icing mechanism operative when ice begins to form on said surfaces.

Still another object of the invention is to provide a novel combination including an aircraft having a de-icing mechanism, and means responsive to ice formation for rendering said de-icing mechanism operative whereby such mechanism is automatically started when ice forms or tends to form on surfaces of the aircraft.

The above and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration only and is not to be construed as defining the limits of the invention, reference being had to the appended claims for this purpose.

The invention consists susbtantially in the construction, combination, location and relative arrangement of parts for obtaining the results desired in accordance with the foregoing objects, as will be more fully hereinafter set forth in the specification, as shown in the drawing, by way of example, and as finally pointed out in the claims.

In the drawing wherein like reference characters refer to like parts throughout the three views, Fig. 1 is a plan view of a portion of an aircraft, showing, more or less diagrammatically, one arrangement of elements embodying the novel combination of the present invention;

Fig. 2 is a detailed sectional view of a solenoid valve automatically controlled in accordance with the present invention for rendering the de-icing mechanism operative; and Fig. 3 is a vertical section of one form of automatic control device by means of which the solenoid valve of Fig. 2 is controlled and operated to control the de-icing mechanism.

Referring to the drawing and more particularly to Fig. 1, there is shown, in plan view, a portion of an airplane 4 having wings 5 and 6 provided with ice overshoes 7 and 8 at the leading edges thereof. Air under pressure for inflating the air cells or overshoes 7 and 8 is preferably derived from an engine driven pump 9 driven by the engine 10. Each of the shoes used may be provided with a separate pipe for supplying the air thereto from the pump 9 but, in the form illustrated, a distributor 11 is employed which is connected to the pump 9 through an oil separator 12 by means of pipe connections 13, 14 and 15 and is provided with three outlets 16, 17 and 18, the outlets 16 and 17 being connected to the overshoes 7 and 8 on the wings 5 and 6 and the outlet 18 being connected to an overshoe or overshoes provided on the leading edges of the tail structure (not shown) of the airplane. The distributor is driven by an electric motor (not shown) energized from a suitable source of electrical energy such as a battery 19 when the manually operated switch 20 is closed. The negative side of the battery is grounded at 21 and the positive side is connected through the switch 20 to one side of the distributor motor and the other side of the distributor motor is connected through a winding 22 of a solenoid valve 23, the purpose of which will appear hereinafter, and through a signal device such as a lamp 24 which is in parallel with the winding 22. The circuit of winding 22 and lamp 24 is completed to ground through an automatic switch which will be described hereinafter.

In operation, pump 9 drives air under pressure to the distributor 11 from which it is supplied in sequence, first to overshoe 7, then to overshoe 8, and to the overshoe or overshoes on the tail structure, and is exhausted then to the atmosphere by means of an exhaust pipe 26 all in the manner shown and described in the aforementioned Patent No. 1,990,866.

Means are now provided for automatically controlling the de-icing mechanism whereby the latter is automatically rendered operative when ice begins to form on the surfaces of the aircraft. In the form shown said means include the solenoid valve 23 and a device 27 mounted on the wing 5 so that said device is in the path of the slip stream. Said device includes the aforementioned automatic switch indicated at 28 which is normally open but is automatically closed, in a manner to be described later, when ice forms at the front of the device 27 whereby the solenoid valve 23 is actuated to closed position. Normally the pump 9 exhausts directly to the atmosphere by means of an exhaust pipe 29, said pump 9 being connected to the solenoid valve 23 by means of a pipe 30. Therefore, one side of the automatic switch 28 is connected to the ground at 31 and the other side is connected to the winding 22 of the solenoid valve 23 as hereinbefore stated.

The solenoid valve is shown in detail section in Fig. 2 and comprises a housing 32 provided with a lateral passage 33 therethrough having an inlet 34 and an outlet 35, the inlet 34 being connected to the pump 9 by means of the pipe 30 and the outlet 35 being connected to the exhaust pipe 29 as shown in Fig. 1. The passage 33 is adapted to be closed by means of a valve member 36 which is adapted to be moved into the seat 37 against the pull of the spring 38. The spring 38 is a coil spring and one end thereof is secured to an adjustable nut 39 threaded in an extension 40 of the housing 32 and the other end of said spring is secured to the end of the valve stem 41 of the valve member 36. The valve stem 41 is of magnetic material such as soft iron and constitutes a plunger of the solenoid formed by coil 22 which is wound on a sleeve 42 through which the plunger 41 extends. The ends of the coil 22 are connected to the terminal binding posts 43 and 44 by means of which the coil 22 is connected to the device 27 and to the battery 19 through the distributor 11.

Normally, the passage 33 is open, as shown, with the valve member 36 suspended from the spring 38, so that the pump 9 is connected to the atmosphere through said passage 33 and exhaust pipe 29, whereby the pump is ineffective to supply air pressure to the distributor 11 and, hence, to the overshoes or de-icers. When the automatic switch 28 of the device 27 is closed, however, the coil or winding 22 becomes energized thereby operating the plunger 41 by a downward magnetic pull against the pull of the coil spring 38, thus closing the passage 33, whereby the pump is then effective to supply air to the overshoes through the distributor which, as previously stated, inflates the shoes in a cyclic sequence in a manner described and claimed in the aforesaid Patent No. 1,990,866 whereby when one overshoe is inflated the second overshoe is partially inflated and the third overshoe is deflated, each overshoe becoming inflated in turn.

A by-pass 45 is provided which communicates with the passage 33 on opposite sides of the valve seat 37. The by-pass 45 is normally closed by means of the valve member 46 which is held in closed position by means of a coil spring 47 one end of which abuts the valve member 46 and the other end of which abuts an adjustable nut 48 which is provided for regulating the pressure at which the valve 46 may automatically open. The valve 46 constitutes a relief valve for releasing the air to the atmosphere when the pressure in the pump exceeds a predetermined limit determined by the adjustment of the spring 47 and when the valve member 36 is in closed position, i. e., when the de-icing mechanism is operating.

The automatic control device which is responsive to ice formation is shown in sectional detail in Fig. 3 and is disclosed and claimed in co-pending application of Paul Leifheit, Serial No. 54,466, filed of even date herewith, but, generally, said device comprises a stream-lined tubular member 49 which merges into a separate stream-lined compartment 50 formed by a tapered end 51 and a blunt front end 52 facing the direction of travel of the airplane, and also by side walls (not shown). The device is carried by a stream-lined mounting bracket 53 by means of which said device may be mounted on the wing of the airplane as shown in Fig. 1 so that when the aircraft is in flight, air enters at the left end of the tubular member 49, as viewed in Fig. 3, passes therethrough and out of said member.

Within the tubular member 49 and in the path of the air passing therethrough there is provided a member in the form of a paddle having a circular portion 54 and an integral arm 55 which projects into a slot 56 provided in the bottom wall of the tubular member 49 and into the compartment 50. The arm 55 is pivoted on a shaft 57 the ends of which are secured in the side walls of the compartment 50 so that as air rushes through the tubular member 49 the circular portion 54 of the paddle is moved in the direction of the arrow shown in Fig. 3 against the compression of a coil spring 58 one end of which abuts the end 59 of the paddle arm 55 and the other end of which is fastened to a screw 60 in the front wall 52 of the auxiliary compartment 50. On the opposite side of the paddle arm 55 there is provided a contact finger 61 carrying a contact 62 which is adapted to cooperate with a relatively fixed or stationary contact 63 carried by an adjusting screw 64 secured in and passing through the rear end 51 and insulated therefrom by means of an insulating bushing 65.

The contact 63 is connected to a wire 66 by means of a terminal lug secured to the adjusting screw 64 by means of a nut 67. Contact 62 is grounded by virtue of its connection to the finger 61 and arm 55 which for this purpose are made of metal as is the shaft 57 and the tubular member 49 and the mounting bracket 53. If, however, the mounting bracket 53 cannot be mounted on a grounded portion of the aircraft then the ground connection is provided by means of a wire 69 one end of which is connected to the portion 51 of the device by means of a screw 70 and the other end of the wire 69 is connected to the ground 31 as in Fig. 1.

The coil spring 58 tends to urge the end 59 of the arm 55 to the right as viewed in Fig. 3 to cause the contact 62 to engage contact 63 thereby tending to close the circuit to the winding 22 of the solenoid valve 23 and to the signal lamp 24 when the manually operated switch 20 is closed. Normally, however, when the device is mounted on the wing of the aircraft, as shown in Fig. 1, the rush of air through the tubular member 49 urges the circular portion 54 of the paddle in the direction of the arrow, as shown in Fig. 3, against the compression of the spring 58 thereby maintaining the contacts 62 and 63 normally open. Thus, the contacts 62 and 63 constitute the automatic switch 28 referred to hereinbefore and shown generally in Fig. 1.

Means are now provided whereby the rush of air through the tubular member 49 is prevented when ice forming conditions exist and, as illustrated, said means comprise a fine wire mesh screen 71 placed over the front end of the tubular member 49, said screen being securely held in place by means of a clamping ring 72 secured to the tubular member 49 in any suitable manner as by means of screws 73. Thus, as sleet and/or ice form on the screen 71, the passage through the tubular member 49 becomes blocked either partially or entirely whereby the air pressure on the circular portion 54 of the paddle is reduced or eliminated so that the coil spring 58 urges the contact 62 into engagement with the contact 63 to close the electrical circuit to the winding 22 and signal lamp 24 thereby giving a warning signal and automatically starting the de-icing mechanism in operation to periodically inflate and deflate the overshoes 7 and 8 which, as previously stated, are of rubber fabric so that the stretch of the fabric breaks the ice which is then carried away by the air stream.

The signal lamp 24 is preferably mounted on the instrument panel (not shown) of the aircraft so that the pilot may readily observe the same when a signal is given. The signal lamp, however, is not necessary to the operation of the de-icing mechanism.

There is thus provided a novel combination including a de-icing mechanism and a device exposed to the atmosphere for automatically operating said de-icing mechanism when ice forming conditions exist and ice begins to form on the wings of the aircraft whereby accumulation of ice on said wings is substantially eliminated and/or prevented.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. In combination, an aircraft, de-icing mechanism including inflatable members on the surface of said aircraft for preventing accumulation of ice on said surface, means for periodically inflating said inflatable members, and means on said surface and responsive to ice formation for automatically controlling inflating means.

2. In combination with an airplane, a source of fluid pressure, a plurality of expansible members secured to the plane structure, means for periodically connecting the members with said source, and means responsive to ice formation on said plane structure for automatically controlling said connecting means.

3. In combination with an airplane, a source of fluid pressure, a plurality of expansible members secured to the plane structure, means including a distributor valve for periodically connecting the members with said source, and means responsive to ice formation on said plane structure for automatically controlling said connecting means.

4. In combination with an airplane, a source of fluid pressure, a plurality of expansible members secured to the plane structure, means for periodically connecting said members with said source, and means on said plane structure and responsive to ice formation on said structure for automatically controlling said connecting means.

5. In combination with an airplane having an engine driven pump, a plurality of expansible members secured to the plane structure, a distributor valve for supplying fluid under pressure from said pump to said expansible members, means normally rendering said pump ineffective to supply fluid under pressure, and means responsive to ice formation on said plane structure for automatically actuating said last-named means whereby said pump is rendered effective to supply fluid under pressure to said expansible members through said distributor valve.

6. In combination with an airplane, a plurality of expansible members connected to the plane structure, an air pump, means for driving said pump, an electrically operated rotary distributor valve for connecting said pump to said expansible members, a solenoid valve normally rendering said pump ineffective to pump air to said distributor valve, an electric circuit including said rotary distributor, said solenoid valve and a source of electric current, and means responsive to ice formation on said plane structure for rendering said circuit effective to cause actuation of said rotary distributor and solenoid valve whereby said pump supplies air under pressure to said expansible members through said distributor.

HOWARD E. BAER.